Figure 1:
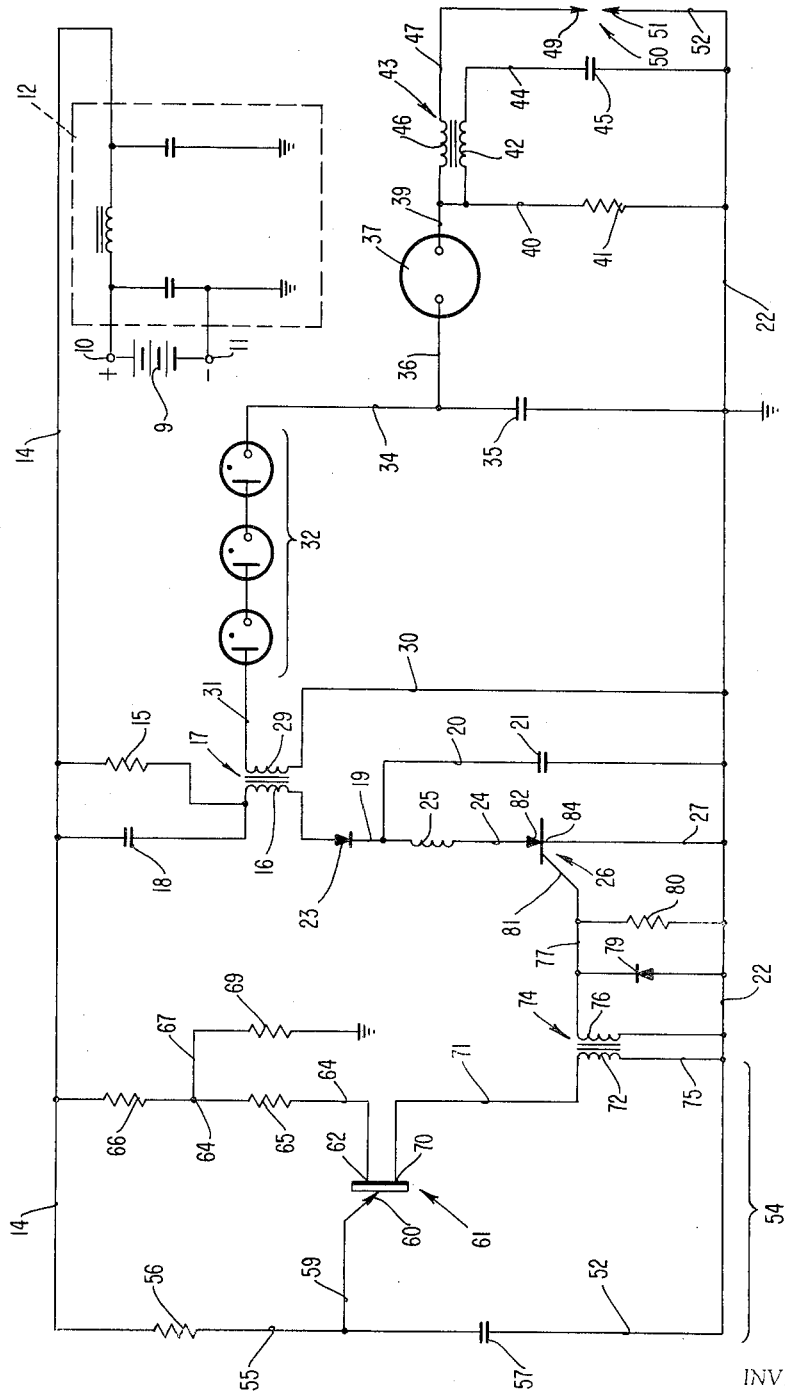

Dec. 14, 1965 D. C. BROWN 3,223,887
ELECTRICAL APPARATUS
Filed June 29, 1962 2 Sheets-Sheet 1

INVENTOR.
DAVID C. BROWN
BY
*Bauer and Seymour*
ATTORNEYS

Dec. 14, 1965   D. C. BROWN   3,223,887
ELECTRICAL APPARATUS
Filed June 29, 1962   2 Sheets-Sheet 2

VOLTAGE WAVEFORM ACROSS CAPACITOR 21

VOLTAGE WAVEFORM ACROSS PRIMARY WINDING 16

CURRENT WAVEFORM DURING CHARGE CYCLE FOR CAPACITOR 21

CURRENT AND VOLTAGE WAVEFORMS ACROSS INDUCTOR 25 AND CAPACITOR 21 DURING RESET CYCLE

INVENTOR.
DAVID C. BROWN
BY Bauer and Seymour
ATTORNEYS

United States Patent Office 3,223,887
Patented Dec. 14, 1965

3,223,887
ELECTRICAL APPARATUS
David C. Brown, Sidney, N.Y., assignor to The Bendix Corporation, Sidney, N.Y., a corporation of Delaware
Filed June 29, 1962, Ser. No. 206,236
10 Claims. (Cl. 315—223)

This invention relates to a method and apparatus for generating electrical pulses, and more particularly to a system including a solid state switching device for generating such pulses.

The invention has among its objects the provision of a novel system for generating a succession of electrical pulses.

An object of the invention is to provide novel means for controlling in a novel manner the charging and discharging of a capacitor, whereby a voltage potential in substantial excess of the source voltage may be made available for supplying a load circuit.

Another object of the invention resides in the provision of a novel system which includes a solid state switching device suitable for converting direct current energy into electrical pulses.

Still another object is to provide a novelly constructed electrical circuit wherein a solid state switching device is controlled in a novel manner to control current flow in the circuit.

A further object of the invention lies in the provision of a novel system for generating a plurality of electrical pulses, such system incorporating a solid state switching device and operating in a novel manner to control the switching device.

A still further object is to provide a novel circuit wherein a solid state switch of the silicon controlled rectifier type is automatically reset to a non-conductive state in a novel manner.

Yet another object of the invention lies in the provision of a system having connected pulse generating and load circuits, the load circuit having widely varying current demands, the system being so constructed that a switching device in the pulse generating circuit is not adversely affected by such variations in the load circuit.

Still another object of the invention lies in the provision of a novel system for generating periodic electrical pulses of discharge intensity, such system being suitable for use to supply the ignition needs of a gas powered engine or the like.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

Figure 2:
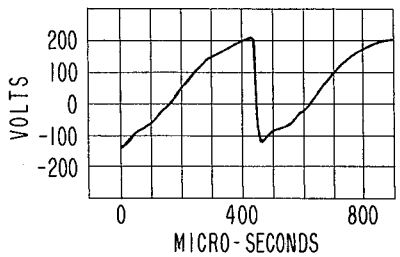
Figure 3:
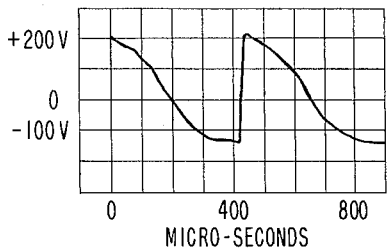
Figure 4:
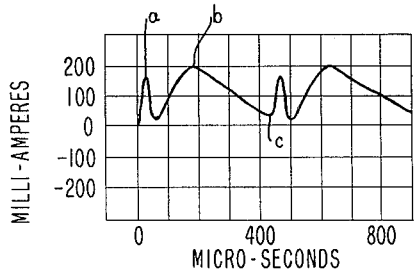
Figure 5:
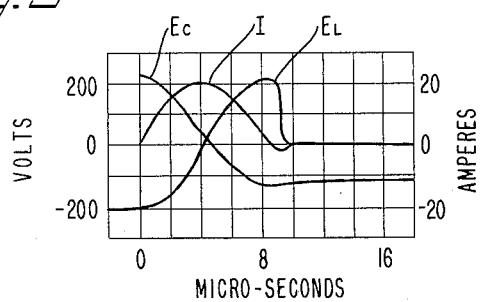

In the drawings, wherein like reference characters refer to like parts throughout the several views, FIG. 1 is a wiring diagram of an ignition circuit made in accordance with a preferred embodiment of the invention;

FIG. 2 is a graph showing the relationship between time and voltage during two consecutive cycles of charging and discharging of condenser 21 of the illustrative system;

FIG. 3 is a graph showing the relationship between time and voltage across the primary 16 of transformer 17 during two consecutive cycles of charging and discharging condenser 21;

FIG. 4 is a graph showing the relationship between time and current through the primary 16 of transformer 17 during two consecutive cycle of charging and discharging condenser 21; and FIG. 5 is a composite graph showing the relationship between time and $E_c$ (the voltage across condenser 21), $E_L$ (the voltage across inductor 25), and I (the current through inductor 25) in that portion of the cycle in which the solid state switching device 26 is rendered conductive and is then reset to its nonconductive condition.

The embodiment of the system of the invention illustrated in FIG. 1 is adapted to supply the ignition needs of a gas powered generator, engine, or the like. The system shown with the values of the components given below is designed to produce spark discharges at a spark gap 50 at a minimum rate of 1 spark per second when the input voltage of the system is 105 volts. The illustrative system is designed to operate with an input voltage ranging from 105 to 145 volts D.C., to store 4 joules of energy, and to operate satisfactorily to produce sparks at the above frequency and of the above energy over a range of −65° C. to 105° C. It is to be understood, however, that with suitable changes in the values of the components the system of the invention may be used to advantage in a number of different applications wherein a plurality of periodically generated electrical pulses are required, such as to supply the ignition needs of an engine of the jet or ram jet type. It is also to be understood that certain sub-combinations of the illustrative circuit, such as the means for periodically resetting or rendering non-conductive the solid state switching device 26, and for amplifying the source voltage are useful in circuits of various other types.

The illustrative circuit shown in FIG. 1 has two input terminals 10 and 11, terminal 10 being adapted to be connected to the positive terminal of a direct current source 9 and terminal 11 being connected to the other terminal thereof. In the embodiment shown, the direct current source may have a voltage, for example, of 105–145 volts. Terminals 10 and 11 are connected to a radio filter generally designated 12, terminal 11 being connected to ground and terminal 10 being connected to the main positive bus wire 14 through an inductance. Condensers are connected from opposite sides of such inductance to ground, as shown. The system, as shown by way of example, includes another bus wire 22 which is connected to ground as shown and thus is connected to negative terminal 11 of the source of power.

Connected across wires 14 and 22 is a circuit for charging the above-mentioned condenser 21. Such charging circuit includes the series connected resistor 15 and primary 16 of transformer 17, wire 19 preferably having a diode 23 interposed therein, and wire 20 connected to one terminal of condenser 21, the other terminal of such condenser being connected to wire 22. Connected to wire 19 in parallel with wire 20 and condenser 21 are a series connected inductance 25, a wire 24, and the anode of the above-mentioned solid state switching device 26, the cathode of such device being connected to wire 22 by a wire 27. A condenser 18 is connected in parallel with resistor 15 between wire 14 and the primary 16 of transformer 17. When the switching device 26 is non-conductive, condenser 21 is charged through the circuit 15, 18, 16, 19, 23, 20. When switching device 26 is rendered conductive, condenser 21 is discharged through a discharge loop made up of wire 20, inductance 25, wire 24, switching device 26, and wires 27 and 22. Switching device 26 is alternately rendered conductive and non-conductive by circuit means to be described hereinafter. In the circuit of the invention, energy is transferred from the circuit for charging condenser 21 to an output load circuit connected to the secondary 29 of transformer 17, such transfer of energy from the primary to the secondary of the transformer taking place only during that portion of each cycle in which switching device 26 is non-conductive. As a result, as will be seen more clearly hereinafter, changes in current demand by the output or load circuit are not reflected back into the switching device 26.

In the ignition circuit shown, one end of secondary winding 29 of transformer 17 is connected to bus wire 22 by wire 30. The other end of such secondary winding is connected by a wire 31 to a bank 32 of serially connected similarly disposed rectifiers, the output of the rectifier bank being led through wire 34 to one terminal of a storage condenser 35. The other terminal of condenser 35 is connected to wire 22 and thus to ground, as shown. The first terminal of condenser 35 is connected by a wire 36 to a control gap 37 which may, for example, have a breakdown voltage of 3000 volts. The output lead 39 from the control gap is connected to ground through wire 40 having a resistor 41 interposed therein. Connected to wires 39 and 40, as shown, are the secondary 46 and primary 42, respectively, of a voltage step-up transformer 43. The other end of primary 42 is connected by wire 44 to one terminal of a small condenser 45, the other terminal of the condenser being connected to wire 22. The second end of secondary 46 is connected by a wire 47 to one electrode 49 of the above-mentioned spark gap 50, the other electrode 51 of such gap being connected to wire 22 and thus ground by wire 52.

When the described circuit is in operation, the storage condenser 35 is progressively incrementally charged from substantially zero voltage to a voltage sufficient to break down the gap between the electrodes of control gap 37. Thereupon the charge on condenser 35 flows through the control gap. The current flowing in wire 39 initially flows through primary 42 and into condenser 45, thereby inducing a higher voltage in secondary 46, such higher voltage being sufficient to ionize igniter gap 50. After this gap has been thus ionized, the remaining and hence major portion of the charge from the storage condenser 35 flows directly through secondary 46 and across discharge gap 50. The thus described load or output circuit presents a load which constitutes substantially a short circuit when storage condenser 35 is substantially completely discharged. When such condenser has become fully charged, however, the current demand of the output circuit is very small. The circuit of the present invention effectively isolates the switching device 26 from such varying load demands, thereby assuring a long life for the switching device.

The solid state switching device 26 shown is specifically a silicon controlled rectifier having a gate 81, the rectifier being rendered electrically conductive between its anode 82 and its cathode 84 when the gate 81 is subjected to a positive pulse having a minimum predetermined voltage, current and duration. In the illustrative circuit, the pulses applied to gate 81 are generated by a relaxation oscillator which is generally designated 54. Such oscillator is driven by power derived from a direct current supply which may be battery 9.

Connected across wires 14 and 22 is a wire 55 having a resistor 56 and a condenser 57 interposed therein. Connected to wire 55 between such resistor and condenser is a wire 59 which is connected to the emitter 60 of the unijunction transistor 61. The base-two 62 of transistor 61 is connected by a wire 64 through series connected resistors 65 and 66 to wire 14. A wire 67 is connected to wire 64 between resistors 65 and 66, such wire being connected to ground through a resistor 69. The base-one 70 of transistor 61 is connected by a wire 71 to a first end of the primary 72 of a transformer 74. The other end of such primary is connected to wire 22 and thus to ground by a wire 75. It will be apparent that the condenser 57 of the relaxation oscillator is periodically charged from the power source 9, and that when the charge on such condenser reaches a potential equaling the critical voltage of the emitter 60 of transistor 61 the transistor becomes conductive between the emitter and the base-one 70, thereby establishing a discharge loop 59, 60, 70, 71, 72, 22 and 52 for condenser 57.

Each variation in current flow through primary 72 of transformer 74, as a result of the discharging of condenser 57, induces a voltage in the secondary 76 of transformer 74. One end of secondary 76 is connected by a wire 77 to the aforementioned gate 81 of silicon controlled rectifier 26. The other end of secondary 76 is connected to ground wire 22. The negative halve of the voltage wave form produced in secondary 76 is removed by a diode 79 which is connected across wires 77 and 22. A temperature stablizing resistor 80 is also connected in parallel with diode 79 across wires 77 and 22 to prevent any increase of bias on gate 81 to an undesirable level as a result of leakage which varies with temperature.

One satisfactory system in accordance with the invention has the principal components thereof with values as follows:

| Resistors: | Ohms |
| --- | --- |
| 15 | 200 |
| 41 | 50K |
| 56 | 33K |
| 65 | 470 |
| 66 | 3.6K |
| 69 | 1K |
| 80 | 1K |

| Condensers: | μfd. |
| --- | --- |
| 21 | 0.25 |
| 35 | 1.28 |
| 45 | 0.06 |
| 57 | 0.1 |

In the illustrative system of FIG. 1, the condenser 18, connected in parallel with resistor 15 between wire 14 and the first end of primary 16 of transformer 17, is of relatively large capacity. Condenser 18 may have a capacity, for example, of 1.0 μfd. Inductor 25 has an inductance value of 0.07 millihenry.

In such illustrative system the relaxation oscillator 54 has a frequency of 2200 cycles per second. Thus condenser 21 is alternately charged and discharged at the same rate. The illustrative system operates satisfactorily with an input voltage ranging from 105 to 145 volts D.C. As the voltage of the direct current source 9 increases within these limits, the rate of spark discharge at gap 50 increases by reason of the placing of an incremental charge of higher voltage on condenser 21 at each of the charging circuit cycles, thereby resulting in a more rapid charging of storage condenser 35 to the discharge voltage of control gap 37. An increase in the voltage of the direct current source also causes a higher negative charge to remain on condenser 21 during the resetting or turning off of the silicon controlled rectifier 26.

The system of FIG. 1 operates as follows: When the silicon controlled rectifier 26 is non-conductive, the condenser 21 charges from wire 14 through resistor 15, condenser 18, and the primary 16 of transformer 17. If the cycle of the system under consideration is an intermediate one, that is, one following appreciably the initiation of operation of the system, the condenser 21 will hold a negative charge at time 0, as shown in FIG. 2, for reasons to be explained. In the time span of about 450 μsec., as shown in FIG. 2, the voltage of the charge on condenser 21 rises from an initial value of −110 volts to +220 volts. During such same time span, the voltage across primary 16 of transformer 17 drops from an initial value of substantially +220 volts to −110 volts, as shown in FIG. 3. The current in the circuit 15, 16, 19, 20, 21 varies in about the manner shown in FIG. 4 during such 450 μsec. period. Such voltage and current relationships result from the following manner of operation of the condenser charging circuit.

Assuming no charge on condenser 21 and that the silicon controlled rectifier 26 is non-conductive, the condenser 18, which is then substantially uncharged, acts as a short circuit across resistor 15, thereby giving a sudden initial pulse or momentary increase and decrease in the current flowing in primary 16 of transformer 17. Such initial pulse of current, shown at $a$ in FIG. 4, through primary 16 produces a high voltage pulse in the secondary 29 of transformer 17. Thereafter condenser 21 is progressively charged to the battery voltage as the current flow through the primary 16 progressively increases to $b$. As this current decreases, to $c$, the self-induced voltage of primary 16 aids the D.C. source 9 and results in further charging condenser 21 to a voltage in excess of the source voltage. Thus, in the illustrative system, with parts having the above-mentioned values, the voltage across condenser 21 rises to a value which is in excess of but no greater than twice the voltage of the direct current source for the system, the excess being dependent upon the value of limiting resistance 15.

As above noted, energy is transferred from primary 16 to the secondary 29 of transformer 17 only during the periods of charging of condenser 21, each of which, in the illustrative circuit, requires about 450 μsec. During such periods the silicon controlled rectifier 26 remains non-conductive, and thus isolated from and protected from the effects of the variable current demands of the load circuit connected to the secondary of the transformer 17.

The silicon controlled rectifier 26 begins to conduct when the relaxation oscillator 54 impresses a positive pulse upon gate 81 of the rectifier. When this occurs, rectifier 26 becomes conductive between its anode 82 and its cathode 84, and a discharge circuit is established for condenser 21 by way of wire 20, inductor 25, silicon controlled rectifier 26, and wires 27 and 22.

Such discharge of condenser 21 through inductor 25 gives rise to the current and voltage relationships shown in FIG. 5. Rectifier 26 will have been rendered conductive at time 0 in such figure. In a period occupying approximately 10 μsec., the current flowing from condenser 21 and through inductance 25, as shown by curve I, will rise from zero to approximately plus 20 amperes and then decay through zero to a value of approximately −2 amperes. The voltage across condenser 21, as shown by curve $E_c$, will have decreased from about +210 volts to substantially −110 volts in such 10 μsec. period, and the voltage across inductor 25, as shown by curve $E_L$, will have increased from an initial value of about −210 volts to a maximum of about +210 volts at approximately 8 μsec. and will have decayed to zero at 10 μsec. when rectifier 26 becomes non-conductive as explained below. The negative charge on condenser 21 results from the self induced voltage of inductor 25 as the current therein decays after the voltage across condenser 21 reaches zero. When the current I has decayed to zero and there is a negative charge on condenser 21, the rectifier 26 becomes non-conducting. The cycle then begins anew and the voltage across condenser 21 gradually rises, in a time span of approximately 450 μsec., until it reaches approximately +210 volts, as shown in FIG. 2.

Once a silicon controlled rectifier is in its conduction state, it will continue conduction indefinitely after removal of the gate signal until the anode current is interrupted or diverted for a short interval, after which the rectifier will regain its forward blocking capabilities. This property of the silicon controlled rectifier has required prior direct current powered systems employing it as a switching device to be provided with supplementary means for interrupting the anode current of the rectifier. The described system, however, provides a simple automatic means for turning rectifier 26 off without the necessity of providing any further means for doing so. The turning off of the rectifier 26 in accordance with the present invention takes place in the manner to be next described.

The voltage curve $E_c$ of FIG. 5 results from the interaction of the condenser 21, the rectifier 26, and the inductor 25. When the rectifier is conductive, the condenser 21 discharges therethrough and through the inductor 25 to zero voltage. When the voltage $E_c$ is zero, the current I is a maximum and the energy stored in inductor 25 is a maximum. Therefore, in accordance with Lenz's law, as the current I starts to decrease, the voltage $E_c$ on the condenser 21 becomes negative, finally reaching a value of about −110 volts when the current I reaches zero. Such reversal of the polarity of the charge on condenser 21 and thus of the voltage across anode 82 and cathode 84 of the silicon controlled rectifier 26 in conjunction with the cessation of current flow causes the rectifier to automatically turn-off or become non-conductive, as shown in FIG. 5.

The described system is further of advantage because with a direct current source not greatly exceeding 100 volts an effective voltage in excess of 300 volts, i.e. the differential between the maximum positive and negative charges applied to condenser 21 during each cycle, is applied to the primary 16 of transformer 17. Thus such transformer can be smaller and lighter than transformers required by prior systems having a comparable source of voltage. Although the primary 16 of the transformer 17 in a system as herein specifically described, by way of example, is subjected to 300 volts or more, the silicon controlled rectifier 26 is subjected to a maximum of about 210 volts. Thus such rectifier can be one working well within its permissible safe upper operating voltage.

The resistor 15 in the above described circuit functions to limit current flow in the circuit for charging condenser 21. Resistor 15 limits the maximum voltage of the charge attained by such condenser to a safe maximum within the capability of the silicon controlled rectifier 26. When a relatively low voltage current source, such as, for example, 14 to 30 volts, is employed, the resistor 15 and the condenser 18 are not necessary in the circuit, since the voltage of the charge on condenser 21 will never reach the maximum voltage rating of silicon controlled rectifier 26. In such alternative circuit the upper end of the primary winding 16 is connected directly to bus wire 14. With such low voltage current source for the system, the resistors 66 and 69 need not be used. Such resistors, in the illustrative circuit, function as a voltage divider to reduce the voltage applied to base-two 62 of unijunction transistor 61.

The resistor 56 functions to limit the rate of charging of condenser 57, such rate of charging, in turn, governing the frequency of oscillator 54. For maximum efficiency, the value of resistor 56 is selected to cause oscillator 54 to trigger the silicon controlled rectifier 26 to render it conductive when condenser 21 reaches its maximum charge. When such relationship exists, the system will function efficiently even though diode 23 is omitted, since there is then no danger of the discharging of condenser 21 through its charging circuit to the source of current. When the circuit includes diode 23, as shown, the discharge of condenser 21 through its charging circuit is prevented, and the maximum charge on condenser 21 can be held until the silicon controlled rectifier 26 is turned on by a pulse from oscillator 54.

The resistor 80 is employed to insure that the silicon controlled rectifier will not be turned on by leakage current. Such resistor holds the potential of gate 81 of rectifier 26 below the value at which the rectifier fires or becomes conductive unless a firing pulse from oscillator 54 is received at such gate.

Although the specific system illustrated in the drawing and described above may be designed to limit the maximum charge attained by condenser 21 to less than twice the voltage of source 9, it is possible with the novel circuit contemplated by the invention to charge said storage condenser to a voltage several times greater than the source voltage. The maximum permissible charge is determined by the voltage rating of silicon controlled rectifier 26 and the maximum charge possible is determined primarily by the IR circuits in the charging and discharging losses for condenser 21.

Thus, if current-limiting resistor 15 and condenser 18 are omitted, as would normally be the case when the energy source is, by way of example, a battery providing a potential of less than about 30 volts, the condenser 21 may be effectively charged after several cycles of operation to apply as much as 15 times the source voltage across the primary winding 16. If the source voltage is E, condenser 21 will be charged during the first cycle of operation in the manner described above to approximately +2E minus the IR loses in the charging circuit. After the condenser 21 has been thus charged, silicon controlled rectifier 26 is triggered "on" by operation of oscillator 54 in the manner described above and the condenser discharges through the rectifier and inductor 25.

At the completion of the discharge cycle, the voltage across inductor 25 and condenser 21 will be zero, the current, and hence the energy stored in inductor 25, will have reached a maximum, and switch 26 will be turned "off." The subsequent decay of current in inductor 25 induces a positive voltage across the inductor and charges condenser 21 to a comparable negative voltage of approximately 2V less the IR losses in the discharge circuit for the condenser.

Since condenser 21 is in series with battery 9 in its charging circuit, this residual negative charge on the condenser aids the battery in again charging the condenser to a positive polarity while switch 26 is non-conductive, the total new charge equaling the sum of such residual negative charge and twice the source voltage minus the IR losses. This operation is cyclically repeated with the voltage on condenser 21 increasing during each complete cycle until the IR losses of the circuit are equal to the energy added by the battery during each cycle. The total voltage differential applied to condenser 21 is applied across primary winding 16 during each charging cycle and hence is effective for charging storage condenser 35. The circuit thus provided is exceptionally efficient and permits of the use of a much smaller transformer 17 for supplying a given load requirement.

In a typical circuit with a presently available silicon controlled rectifier and a 22 volt source of direct current energy, the charge on condenser 21 may be made to vary between about +180 volts and −140 volts, the limit being reached when the IR drop of the circuit equals the energy supplied during each cycle by the source. The full differential of 320 volts is applied to transformer 17 during each charging cycle of condenser 21 for energizing a load circuit such as the illustrated ignition circuit.

Although only a limited number of embodiments of the invention have been illustrated in the accompanying drawings and described in the foregoing specification, it is to be especially understood that various changes, such as in the relative dimensions and values of the parts, materials used, and the like, as well as the suggested manner of use of the apparatus of the invention, may be made therein without departing from the spirit and scope of the invention as will now be apparent to those skilled in the art.

What is claimed is:

1. A system for generating a succession of electrical pulses comprising a source of direct current, a transformer, first circuit means connected across said source, said circuit means including the primary winding of said transformer and a condenser connected in series, second circuit means including an inductor and a switching device connected in series with each other and in parallel with said condenser, output circuit means including the secondary winding of said transformer to receive energy from said primary winding while the condenser is being charged by said source, means to render the switching device alternately conductive and non-conductive whereby alternately to charge and discharge the condenser, and a diode in the first circuit means interposed between said primary winding and a junction between the condenser and the series connected inductor and switching device, said diode permitting charging current to flow to the condenser but preventing condenser discharging current from flowing to said primary winding.

2. A system for generating a succession of electrical pulses, comprising a source of direct current, a transformer having a primary and a secondary winding, circuit means connected across said source, said circuit means including the primary winding of the transformer and a first condenser, an inductor and a switching device connected in series across said condenser from a junction between said condenser and said primary winding, means to render the switching device alternately conductive for discharging the condenser and non-conductive when the condenser is being charged, and an output circuit connected to the secondary winding of the transformer, said output circuit including a storage condenser progressively charged by pulses of energy induced from the primary winding to the secondary winding of the transformer when the switching device is non-conductive and the first condenser is being charged, and a discharge gap connected to the storage condenser, whereby an electrical discharge is formed at the gap when the charge on the storage condenser reaches a predetermined voltage level.

3. A system as defined in claim 2 comprising a diode so connected between said primary winding and said junction as to block the discharging of said condenser through the primary winding.

4. An electrical system comprising a source of direct current, a transformer, a condenser connected in series with the primary winding of said transformer across said source, a diode connected between said primary winding and said condenser to block the discharging of said condenser through said primary winding, an inductor and a normally non-conductive switching device connected across said condenser from a junction between said diode and said condenser, and means for rendering said switching device momentarily conductive to permit discharge of the condenser through said inductor.

5. An electrical system comprising a source of direct current, a transformer, a diode, a condenser connected in series with the primary winding of said transformer and said diode across said source to be charged to one polarity by said source through a charging circuit, said diode being connected between said condenser and said primary winding to block the discharging of the condenser through the primary winding, a discharge circuit connected across said condenser from a junction between said condenser and diode including means for storing energy discharged by said condenser and adapted to charge said condenser to the opposite polarity, and switch means connected in said discharge circuit in series with said means for storing energy for closing said discharge circuit when said condenser has been charged by said source and for opening said discharge circuit when said condenser is in discharged condition, the condenser and source being connected in series in the charging circuit so that the charge of said opposite polarity on said condenser aids the source in charging said condenser to said one polarity while said discharge circuit is opened by said switch means.

6. An electrical system as defined in claim 5 wherein said means for storing energy in the condenser discharge circuit comprises an inductance.

7. An electrical system as defined in claim 5 wherein said switch means comprises a normally non-conductive electronic valve.

8. An electrical system as defined in claim 5 wherein said switch means comprises a silicon controlled rectifier.

9. An electrical system as defined in claim 5 comprising an electronic pulse generator for periodically rendering said switch means operative for closing the discharge circuit.

10. An electrical system as defined in claim 5 wherein said switch means becomes operative to open the discharge circuit when the charge on said condenser approaches zero.

References Cited by the Examiner

UNITED STATES PATENTS

| | | | |
|---|---|---|---|
| 2,693,535 | 11/1954 | White | 328—65 X |
| 2,950,419 | 8/1960 | Linkroum | 319—209 |
| 2,955,248 | 10/1960 | Short | 123—148 |
| 3,045,148 | 7/1962 | McNulty et al. | 315—183 |
| 3,049,642 | 8/1962 | Quinn | 315—206 |
| 3,075,136 | 1/1963 | Jones | 307—88.5 |
| 3,113,241 | 12/1963 | Yonushka | 315—209 X |
| 3,134,048 | 5/1964 | Wolfframm et al. | 315—206 |

DAVID J. GALVIN, *Primary Examiner.*